United States Patent [19]

Pavan

[11] Patent Number: 4,515,817

[45] Date of Patent: May 7, 1985

[54] METHOD FOR PRODUCING UNDULATED DOUGH PRODUCTS

[76] Inventor: Mario Pavan, Via Montegrappa, 10, Galliera Veneta, Italy

[21] Appl. No.: 262,725

[22] Filed: May 11, 1981

[30] Foreign Application Priority Data

May 15, 1980 [IT] Italy ............................. 22096 A/80

[51] Int. Cl.³ ........................... A23L 1/00; A23C 3/00
[52] U.S. Cl. ................................. 426/106; 426/502; 426/517; 426/557; 426/128; 99/353
[58] Field of Search ............... 426/557, 560, 451, 144, 426/502, 512, 517, 108, 121, 128, 106; D1/14–15

[56] References Cited

U.S. PATENT DOCUMENTS

| | | | |
|---|---|---|---|
| D. 29,311 | 9/1898 | Murray | D1/14 |
| D. 168,054 | 10/1952 | La Rosa | D1/14 |
| D. 248,256 | 6/1978 | Pallando | D1/14 |
| 3,168,462 | 6/1964 | Katz | 426/451 |
| 3,252,805 | 5/1966 | Sienkiewiez | 426/451 |
| 4,094,996 | 6/1978 | Sakakibara | 426/557 |

OTHER PUBLICATIONS

Eby, "Pasta", Better Homes and Gardens, Sep. 1970, pp. 76, 78, 80 and 82.

*Primary Examiner*—Raymond Jones
*Assistant Examiner*—Elizabeth A. King
*Attorney, Agent, or Firm*—Guido Modiano; Albert Josif

[57] ABSTRACT

The invention relates to a method for producing dried dough, which comprises the sequential steps of preparing a sheet of fresh dough, pre-cooking said dough sheet for instantaneization, shaping said dough sheet to reduce the contact areas between overlaid sheets to discrete spots while completing an initial drying step, cutting said shaped and partly dried dough sheet to size, and carrying out a final drying step on said dough sheet as cut to size.

3 Claims, 3 Drawing Figures

METHOD FOR PRODUCING UNDULATED DOUGH PRODUCTS

BACKGROUND OF THE INVENTION

This invention relates to a method for producing dried dough, a system for implementing it, and the resulting product.

As is known in the art, a problem currently felt is that of reducing the preparation time of so-called "first courses", i.e. alimentary dough based meal courses.

In an attempt to obviate the foregoing problem, dried dough products have been marketed which are pre-cooked such as to reduce their preparation time for the home user as well as the overall cooking time of various dishes.

Such known types of pre-cooked dough food products are subjected, during their production process, to a pre-cooking treatment, whereby it later becomes sufficient, e.g. when preparing "lasagne" or "cannelloni" dishes, to cook a dish in an oven which has been preset to bring the dough to a fully cooked final condition.

However, the latter type of pre-cooked dough requires cooking times on the order of 30 to 40 minutes, and while making the preparation of the dish simpler, cannot afford any effective reduction in the dish preparation time.

Other types of currently available dried dough food products are treated with a pre-cooking procedure which is generally known as "instantaneization", i.e. a process whereby the dough is made suitable for instant use. In actual practice, they are caused to undergo almost complete cooking, such that at the moment they are to be used, such dough products only require a liquid treatment of a few minute duration to practically allow the dough to absorb the right amount of liquid, thereby the dough becomes ready for consumption.

Again in the field of "ready made" first courses, the preparation should be mentioned of a fully dressed course which is then subjected to deep freezing for subsequent sale to the consumers, it being intended for de-freezing in an oven at the moment of its use.

This approach has proved disadvantageous in that, additionally to involving very high production costs as determined by the so-called "cold chain", it requires a comparatively long time for de-freezing and heating the product.

Therefore, the status of the art offers no products which can enable the preparation of a finished first course within a short time, i.e. on the order of a few minutes.

SUMMARY OF THE INVENTION

It is a primary object of this invention to eliminate the shortcomings of previous approaches by providing a method for producing dried dough which can afford the obtainment of a product effective to enable the final user to get a finished dish ready in an extremely short time and without applying any special skill or trained experience.

Another object of the invention is to provide a dried dough food product, preferably of the "lasagne" type, which is so treated as to facilitate the preparation of a dish, prevent the various layers of "lasagne" from sticking to one another, and accordingly meet the requirements of the final users, whose demand for good quality and quick preparation food products is ever increasing.

It is a further object of the invention to provide a product which is suitable, in actual practice, for pre-packaging in ready-made packages, thereby the user is only required to add a sauce or any desired seasoning to it and then cook it to accomplish a fully finished dish within but a few minutes.

The above objects, as well as other objects such as will be apparent hereinafter, are all achieved by a method for producing dried dough, characterized in that it comprises the sequential steps of producing a sheet of fresh dough, pre-cooking said sheet for instantaneization, shaping said sheet such as to reduce the contact areas between overlaid sheets to discrete points and simultaneously carrying out a first drying operation, cutting said shaped and partly dried sheet to size, and carrying out a second or final drying operation on said cut to size dough sheet.

BRIEF DESCRIPTION OF THE DRAWING

Further features and advantages will be more clearly understood from the following description of a preferred but not limitative embodiment of a method for producing dried dough, a system for implementing said method, and resulting product, as illustrated by way of example only in the accompanying drawing, where.

DESCRIPTION OF THE PREFERRED EMBODIMENTS

Figure 1:
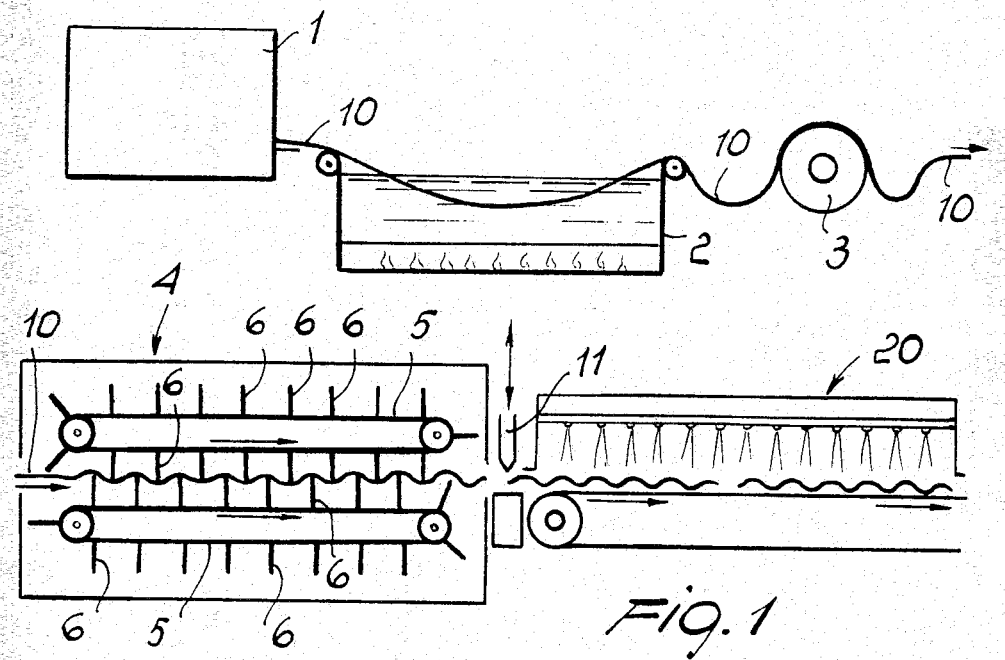
FIG. 1 shows diagramatically the system provided for implementing the method according to this invention.

With reference to the drawing figures, this method of producing dried dough, in particular of the "lasagne" type, comprises the following sequential steps. Firstly a fresh dough is produced by using conventional techniques and any suitable ingredients.

A sheet of said fresh dough, which is produced at a station 1 and not further described herein because known per se, is then subjected to a pre-cooking treatment by immersion in a tank 2 containing water at 100° C., with a residence time in the 2 to 3 minute range, according to the quality and thickness of the sheet itself.

Upon leaving the tank 2, the sheet is next started over an idle deflecting roller 3 which is located upstream of a shaping station generally indicated at 4.

The function of the roller 3 is practically that of a buffer device effective to prevent the sheet, which is being produced and supplied on a continuous basis, from undergoing pull forces which could result in the breaking or parting of the sheet.

The dough sheet, as described hereinabove, is then delivered, following a step or pre-cooking for instantaneization, to a shaper 4, where the sheet is so configured as to reduce the contact areas between overlaid sheets to discrete spots.

Advantageously, it has been found that an optimum configuration to be imparted to the dough sheet is a substantially sinusoidal pattern having bights which extend transversely to the longitudinal lay of the sheet being supplied.

Simultaneously with the dough sheet shaping step, the sheet is subjected to an initial or preliminary drying procedure which brings the moisture content thereof from about 70%, as exhibited upon emerging from the pre-cooking tank, down to about 20%.

Advantageously, in accordance with a preferred embodiment of the invention, the shaper 4 includes a pair of carpets or conveyor belts 5 arranged to run continuously and side-by-side in mutual facing relationship such as to leave a gap for the sheet being supplied to pass through.

For the purpose of shaping the dough sheet, the carpets 5 are each equipped with vanes 6 or the like which extend perpendicularly to the plane defined by the carpets and are offset with respect to one another such as to engage the sheet, as indicated at 10, at a very narrow area and cause it to take a substantially sinusoidal or wave-like or undulated pattern.

Simultaneously with this shaping step of the dough sheet 10, a thermal stabilizing action is applied, which may be implemented by ventilation accompanied by heating, or other similar methods.

Upon leaving the shaper 4, the dough sheet 10 is moved past a cutter 11 which cuts the sheet into segments of preset dimensions, and preferably but not necessarily, such as to impart to the "lasagna" article a substantially square configuration.

After leaving the cutter, the dough sheet, as cut in the "lasagna" format, is delivered into a drier 20 wherein an additional application of heat reduces its moisture content to approximately 5-6%.

Figure 2:
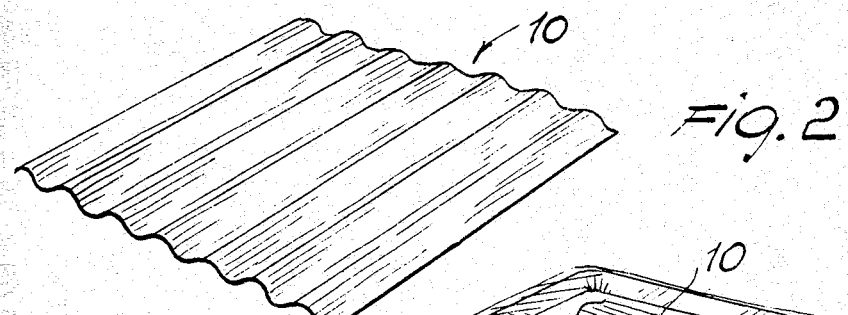
FIG. 2 is a diagramatic perspective view of a possible embodiment of one dough food product configuration.

Thus, a "lasagna" sheet segment is achieved which has substantially the configuration shown in FIG. 2, i.e. is formed with a plurality of parallel undulations.

According to a preferred packaging form, which should not be intended in a restrictive sense, the resulting "lasagne" are laid above one another or stacked in a criss-cross arrangement, i.e. by rotating one "lasagna" through 90° relatively to an underlying one, thereby each "lasagna" only contacts the next one at discrete spots, that is where the undulations cross each other.

This allows the various packaged "lasagne" to be separated from each other by a plurality of channels.

Figure 3:
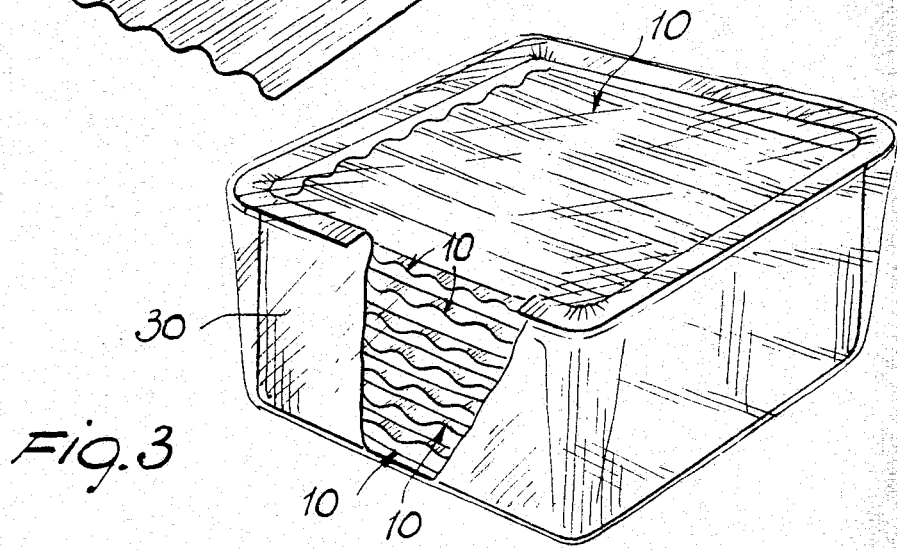
FIG. 3 illustrates, by way of example, one package of the dough food product.

Advantageously but not necessarily, the "lasagne" may be pre-packaged in a throw-away type of baking container 30, e.g. one formed from foil aluminum as shown schematically in FIG. 3, such that the user, in order to make the product ready for consumption, is only required to add a desired sauce or seasoning which shall have to be prepared adequately thinned, i.e. prepared to contain in addition to its own appropriate amount of liquid also an additional amount of liquid equal to the amount which the dough will absorb during the so-called swelling final step, that is during the step when the dried dough is to assume an amount of liquid in order to become ready for consumption.

Thus, the preparation procedure by the user will only require a few minutes; it is in fact sufficient that the user pours the sauce into the container and heats the whole for a few minutes to allow the dough to absorb back the required amount of water to become ready for consumption.

It should be noted that the special configuration of the dough sheet allows the liquid to readily flow between the sheets, to thus create intervening layers of sauce between the dough sheets, thereby a high quality food product can be achieved in a few minutes to solve a problem which has been long felt in the home cooking field.

It will be appreciated from the foregoing that the invention fully achieves its objects, and in particular the fact should be enhanced that the techniques proposed, which comprise substantially precooking for instantaneization accompanied by the shaping of the dough sheet, afford a mode of dish preparation which, in addition to being quite simple and economical, only requires a short time on the order of no more than 5 minutes, which finds no comparison with any similar product currently in use.

The invention as described is susceptible to many modifications and variations within the scope of the instant inventive concept.

Thus, as an example, the shaping step, which provides, as mentioned, a transverse undulation of the dough sheet may also be carried out in different forms, such as projections or bulging areas of various description which, when arranged offset with respect to one another, prevent the various layers from adhering to each other. Moreover, the cutting to the desired size may be carried out at any step of the method.

It should be further pointed out that, while a preparation of the dish has been described hereinabove which contemplates the introduction of the sauce into a pre-arranged stack of lasagna-like sheets which have been laid one above the other, the same result can also be achieved by overlying in succession and alternately dough sheet layers and seasoning layers, depending on the type of dish to be prepared.

Furthermore, all of the constructional details of the system, as well as the various steps of the method according to this invention, may be modified within ample limits without departing from the purview of the present inventive concept.

I claim:

1. A method for producing a pre-cooked shaped dough product, comprising the steps of continuously producing a sheet of fresh dough having a widthwise extension and a longitudinal extension, advancing said sheet in the longitudinal direction thereof, pre-cooking said sheet of fresh dough, forming undulations extending substantially widthwise of said pre-cooked sheet of dough while simultaneously drying said dough sheet to stabilize said undulations and further drying and cutting said dough sheet to size.

2. A method according to claim 1, wherein said drying step is sufficient to reduce the moisture content of said pre-cooked dough from 70%, to about 20%.

3. A package of undulated dried sheets produced by the method of claim 1, comprising a stack of said undulated dried sheets with parallel undulations extending throughout the dough sheet extension, the package having consecutive sheets crosswise stacked one upon the other and wherein the undulations of one stacked dough sheet are arranged transverse to the undulations of the next consecutive dough sheet, thereby the contiguous dough sheets contacting each other at discrete spots where the undulations thereof cross each other.

* * * * *